March 5, 1957  J. R. PADRICK  2,783,701
EARTH WORKING AND PLANTING IMPLEMENT
Original Filed June 9, 1949
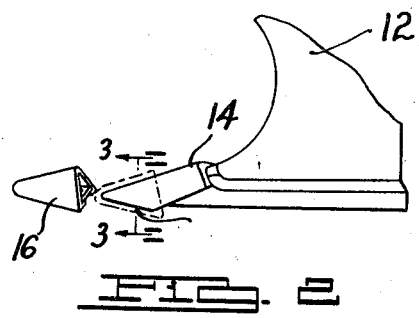
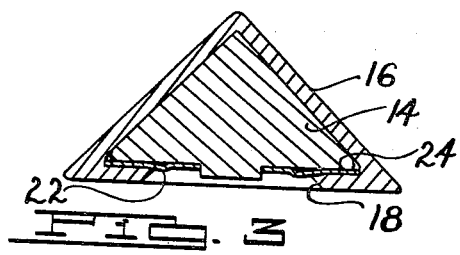
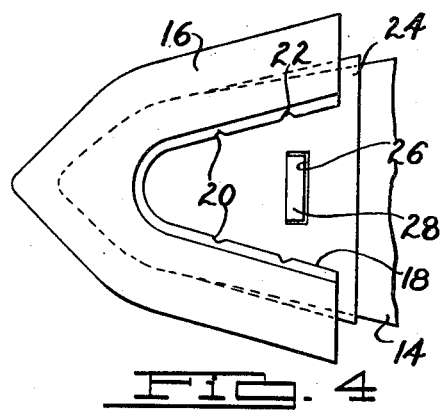
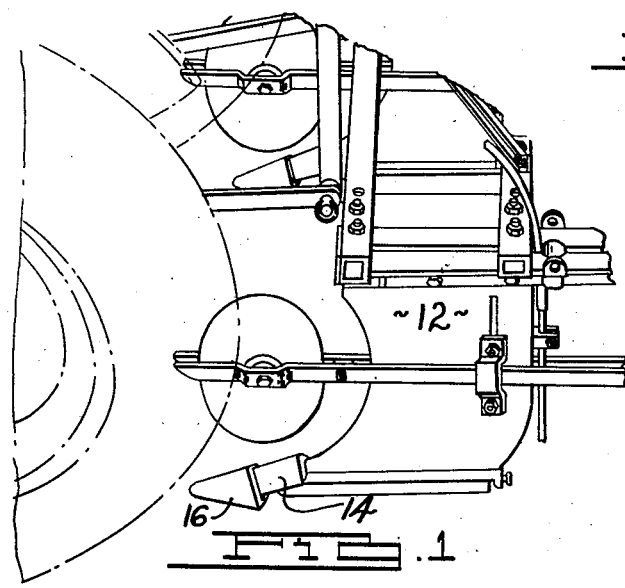
Inventor
John R. Padrick.
By Emerson B Donnell
Attorney

United States Patent Office 2,783,701
Patented Mar. 5, 1957

2,783,701

EARTH WORKING AND PLANTING IMPLEMENT

John R. Padrick, Anniston, Ala.

Original application June 9, 1949, Serial No. 98,107, now Patent No. 2,734,439, dated February 14, 1956. Divided and this application February 6, 1956, Serial No. 563,548

1 Claim. (Cl. 97—78)

This invention relates generally to a novel subsoiler for preparing the soil, and is a divisional application of applicant's copending patent application for improvements in Earth Working and Planting Implement, Serial No. 98,107, now Patent No. 2,734,439, filed June 9, 1949. This invention relates especially to a detachable plow point. It is very desirable to provide means to replace plow points for various conditions of subsoiling and to avoid having to replace a complete subsoil stock when conditions require a change of points only. It is the purpose of the invention to provide a novel means of providing removable points.

It is an object of this invention to provide a novel implement for performing a deep tillage method of soil preparation.

It is a further object of this invention to provide a plow stock which has a removable plow point connected therewith, whereby to permit various types of plow points to be used for working the earth below the topsoil in accordance with the soil conditions.

It is a still further object of this invention to provide a novel implement for preparing the soil which permits much more economical farming than has been heretofore possible and which will produce better yield of crops than has been heretofore possible with known methods and implements.

It is a still further object of this invention to provide an agricultural implement for preparing the soil which will provide reservoirs adjacent the planted seed, to prevent excess runoff from heavy rains, while at the same time preventing loss of seed from water-logging and rot during the periods of heavy rainfall and low temperatures, by providing adequate drainage of the seed bed, thereby maintaining a relatively substantial moisture supply for the seed over a relatively long period of time, as compared with the inconsistent moisture supply which results with normal tillage methods.

It is a still further object of this invention to provide an implement of the type which will materially lower the unit cost of practically all row crops.

These and other objects of this invention will become apparent from the following detailed description, taken in conjunction with the accompanying drawings, in which:

Fig. 1 is a side perspective view of the implement of this invention, connected to a towing vehicle;

Fig. 2 is an exploded side elevation view of the lower portion of one of the plow stocks and shoes of the device illustrated in Fig. 1;

Fig. 3 is an enlarged sectional view of the structure illustrated in Fig. 2, taken along the line 3—3 thereof;

Fig. 4 is an enlarged bottom plan view of the structure illustrated in Fig. 3.

Referring now to the drawings and more particularly Fig. 1, it will be seen that the implement includes a frame assembly 10, which is mounted on a tractor, to be drawn by the latter.

The upper end of a generally vertically extending plow stock 12 is rigidly secured to the frame assembly 10, and is rigidly and detachably secured thereto by suitable means. A plow shoe 14 is detachably connected to the lower end of each plow stock 12, in any suitable manner, and a plow point 16 is detachably secured to the front portion of each plow shoe 14 in the manner illustrated in Figs. 1 through 4. The plow point may be of any suitable shape and the shape of the point depends upon the condition of the soil which is being tilled. For example, if the soil has not been previously tilled deeply, a point which is designed to penetrate at a low draft would be used. A second possible type of point would be one of the expansive type that will crack up the soil below the ground level over quite a large area, or at least over a much wider area than the first point, without disturbing any more of the surface soil than the first point. The type of point illustrated in the drawings is designed to form a generally mole-type channel below the surface of the soil, for reasons which will hereinafter appear. As can be seen from Figs. 2 through 4, the plow point 16 is of a hollow construction and is of a generally triangular shape in cross section. The bottom wall of the point is formed with a generally U-shaped recess or opening 18 which has a plurality of notches 20 around the edge thereof, which are adapted to be engaged by projections 22 in the underside of a plate 24, which is inserted into the hollow portion of the point 16, so as to releasably retain the plate 24 in its proper position within the point 16. The plate 24 is provided with a rectangular opening 26 adjacent the rear end thereof. The plow shoe 14 has a depending lug or tongue 28 formed on the under side thereof which, when the plow point 16 is inserted over the forward end of the plow shoe, will engage the opening 26 in the plate 24, so as to releasably retain the plow point on the plow shoe. The plow point may be removed from the plow shoe by merely inserting a tool between the back end of the plow point and the plow shoe and prying the two apart so that the tongue 28 is moved out of engagement with the opening 26 in the plate 24. With this construction, only the plow point need be hardened and made of especially durable material, while the plow shoe may be made of relatively inexpensive and untempered metal. Then, when the plow point wears out, it may be replaced by a new one and the entire plow shoe need not be replaced, thereby keeping maintenance costs at a minimum.

The above being a complete description of an illustrative embodiment of the invention, what is claimed as new and desired to be secured by Letters Patent of the United States is:

In an earth working implement a plow stock, a plow shoe connected to the lower end of said plow stock, a plow point detachably connected to said plow shoe and including an open-ended hollow body portion adapted to fit over a portion of said shoe and having an opening in one wall thereof, the portion of said wall defining said opening having notches therein, plate means disposed in said hollow body, projections on said plate means releasably engaging said hollow body notches, said plate means having an opening therethrough, said plow shoe having a projection thereon adapted to be disposed in said plate means opening when said plow point is inserted over said plow shoe.

References Cited in the file of this patent

UNITED STATES PATENTS

| 565,352 | Hickman | Aug. 4, 1896 |
| 2,325,991 | White | Aug. 3, 1943 |
| 2,625,870 | Peacock et al. | Jan. 20, 1953 |
| 2,752,702 | Nelson | July 3, 1956 |